(12) United States Patent
Pawley et al.

(10) Patent No.: US 10,539,198 B2
(45) Date of Patent: Jan. 21, 2020

(54) COUPLING ASSEMBLY HAVING AN OVERRUN MODE AND CHANNELED LOCKING MEMBER FOR USE THEREIN

(71) Applicant: Means Industries, Inc., Saginaw, MI (US)

(72) Inventors: Brice A. Pawley, Midland, MI (US); Joshua D. Hand, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 16/173,055

(22) Filed: Oct. 29, 2018

(65) Prior Publication Data

US 2019/0063517 A1    Feb. 28, 2019

Related U.S. Application Data

(62) Division of application No. 15/399,900, filed on Jan. 6, 2017, now Pat. No. 10,145,428.

(60) Provisional application No. 62/291,035, filed on Feb. 4, 2016.

(51) Int. Cl.
| | |
|---|---|
| *F16D 43/28* | (2006.01) |
| *F16D 41/12* | (2006.01) |
| *F16D 41/14* | (2006.01) |
| *F16D 43/284* | (2006.01) |

(52) U.S. Cl.
CPC ........... *F16D 43/284* (2013.01); *F16D 41/12* (2013.01); *F16D 41/125* (2013.01); *F16D 41/14* (2013.01); *F16D 2300/06* (2013.01)

(58) Field of Classification Search
None
See application file for complete search history.

(56) References Cited

U.S. PATENT DOCUMENTS

| | | | |
|---|---|---|---|
| 1,767,593 A | * | 6/1930 | Laabs ............... F16D 41/12 192/42 |
| 4,200,002 A | | 4/1980 | Takahashi |
| 5,070,978 A | | 12/1991 | Pires |

(Continued)

FOREIGN PATENT DOCUMENTS

EP    2930390 A1    10/2015

OTHER PUBLICATIONS

European Patent Office, Extended European Search Report for the corresponding European Patent Applicatio No. 17748331.0 dated Jul. 12, 2019.

(Continued)

*Primary Examiner* — Colby M Hansen
(74) *Attorney, Agent, or Firm* — Brooks Kushman P.C.

(57) ABSTRACT

A coupling assembly having an overrun mode and a channeled locking member are provided. The locking member has a ramped, open channel extending through a nose and main body of the locking member to an upper face of the main body. The locking member is movable between first and second positions. The first position is a coupling position and the second position is an uncoupling position. Pressurized fluid directed to a bottom of the channel urges the locking member towards the second position upon rotation of a first member of the assembly in a first direction relative to a second member of the assembly above a predetermined RPM to prevent abutting engagement of the locking member with a shoulder of the first member in the overrun mode.

9 Claims, 4 Drawing Sheets

(56) References Cited

U.S. PATENT DOCUMENTS

| | | |
|---|---|---|
| 5,449,057 A | 9/1995 | Frank |
| 5,597,057 A | 1/1997 | Ruth et al. |
| 5,806,643 A | 9/1998 | Fitz |
| 5,855,263 A | 1/1999 | Fergle |
| 5,871,071 A | 2/1999 | Sink |
| 5,884,648 A | 3/1999 | Savage |
| 5,918,715 A | 7/1999 | Ruth et al. |
| 5,927,455 A | 7/1999 | Baker et al. |
| 5,954,174 A | 9/1999 | Costin |
| 5,964,331 A | 10/1999 | Reed et al. |
| 5,979,627 A | 11/1999 | Ruth et al. |
| 5,992,592 A * | 11/1999 | Showalter ............... F16D 41/16 192/43.1 |
| 6,065,576 A | 5/2000 | Shaw et al. |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,244,965 B1 | 6/2001 | Klecker et al. |
| 6,386,349 B1 | 5/2002 | Welch |
| 6,481,551 B1 | 11/2002 | Ruth |
| 6,505,721 B1 | 1/2003 | Welch |
| 6,571,926 B2 | 6/2003 | Pawley |
| 6,814,200 B2 * | 11/2004 | Stefina .................... F16D 41/12 192/43.1 |
| 6,854,577 B2 | 2/2005 | Ruth |
| 7,025,188 B2 | 4/2006 | Lindenschmidt et al. |
| 7,100,756 B2 | 9/2006 | Kimes et al. |
| 7,101,306 B2 * | 9/2006 | Blair ......................... F16H 3/66 192/43.1 |
| 7,223,198 B2 | 5/2007 | Kimes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,383,930 B2 | 6/2008 | Kimes et al. |
| 7,448,481 B2 | 11/2008 | Kimes et al. |
| 7,450,548 B2 | 11/2008 | Haustein et al. |
| 7,451,862 B2 | 11/2008 | Kimes et al. |
| 7,455,156 B2 | 11/2008 | Kimes et al. |
| 7,455,157 B2 | 11/2008 | Kimes et al. |
| 7,484,605 B2 | 2/2009 | Pawley et al. |
| 7,614,486 B2 | 11/2009 | Bird et al. |
| 7,661,518 B2 | 2/2010 | Kimes |
| 7,743,678 B2 | 6/2010 | Wittkopp et al. |
| 7,942,781 B2 | 5/2011 | Kimes |
| 7,992,695 B2 | 8/2011 | Wittkopp et al. |
| 8,042,669 B2 | 10/2011 | Samie et al. |
| 8,042,670 B2 | 10/2011 | Bartos et al. |
| 8,051,959 B2 | 11/2011 | Eisengruber |
| 8,056,690 B2 | 11/2011 | Samie et al. |
| 8,079,453 B2 | 12/2011 | Kimes |
| 8,083,042 B2 | 12/2011 | Samie et al. |
| 8,091,696 B2 | 1/2012 | Wittkopp et al. |
| 8,491,439 B2 | 7/2013 | Kimes |
| 8,646,587 B2 | 2/2014 | Kimes |
| 8,720,659 B2 | 5/2014 | Pawley |
| 8,844,693 B2 | 9/2014 | Pawley |
| 8,881,516 B2 | 11/2014 | Bird et al. |
| 8,986,157 B2 | 3/2015 | Kimes |
| 9,121,454 B2 | 9/2015 | Pawley |
| 9,186,977 B2 | 11/2015 | Kimes |
| 9,188,170 B2 | 11/2015 | Prout et al. |
| 9,188,172 B2 | 11/2015 | Felling et al. |
| 9,188,174 B2 | 11/2015 | Beiser et al. |
| 2006/0021839 A1 | 2/2006 | Kimes |
| 2008/0000748 A1 | 1/2008 | Ho |
| 2008/0110715 A1 * | 5/2008 | Pawley ................ F16D 25/061 192/43.1 |
| 2008/0169165 A1 | 7/2008 | Samie et al. |
| 2009/0159391 A1 | 6/2009 | Eisengruber |
| 2010/0288592 A1 | 11/2010 | Papania et al. |
| 2011/0183806 A1 | 7/2011 | Wittkopp et al. |
| 2011/0214962 A1 | 9/2011 | Shaw et al. |
| 2011/0269587 A1 | 11/2011 | Papania |
| 2011/0297500 A1 | 12/2011 | Shaw et al. |
| 2015/0047944 A1 | 2/2015 | Kimes |
| 2017/0067517 A1 | 3/2017 | Miyake et al. |

OTHER PUBLICATIONS

Invitation to Pay Additional Fees and, Where Applicable, Protest Fee mailed Apr. 3, 2017 in PCT Appln. PCT/US2017/016644 (filed Feb. 6, 2017), 2 pages.

International Search Report and Written Opinion, International Application No. PCT/US2017/016644, dated Jun. 1, 2017.

The International Bureau of WIPO, International Preliminary Report on Patentability for the International Application No. PCT/US2017/016644 dated Jun. 1, 2017.

United States Patent and Trademark Office, Restriction Requirement for U.S. Appl. No. 15/399,900 dated Feb. 28, 2018.

United States Patent and Trademark Office, Notice of Allowance and Fee(s) Due for U.S. Appl. No. 15/399,900 dated Aug. 8, 2018.

* cited by examiner

COUPLING ASSEMBLY HAVING AN OVERRUN MODE AND CHANNELED LOCKING MEMBER FOR USE THEREIN

CROSS REFERENCE TO RELATED APPLICATION

This application is a divisional of U.S. application Ser. No. 15/399,900, filed Jan. 6, 2017. That application claims the benefit of U.S. provisional application Ser. No. 62/291,035 filed Feb. 4, 2016.

TECHNICAL FIELD

This invention relates in general to the field of coupling assemblies having an overrun mode and locking members such as struts for use therein.

Overview

As described in U.S. Pat. No. 8,844,693, overrunning coupling assemblies may be used for transferring torque from a driving member to a driven member in a variety of structural environments. This permits the transfer of torque from a driving member to a driven member while permitting freewheeling motion of the driving member relative to the driven member when torque is interrupted. Such couplings often comprise an outer race concentrically disposed with respect to an inner race, the outer race having cammed surfaces that define a pocket in which coupling rollers are assembled.

The driving member is connected to one race, and the driven member is connected to the other race. During torque transfer from the driving member to the driven member, the rollers become locked with a camming action against the cam surfaces, thereby establishing a positive driving connection between the driving member and the driven member. When the torque is interrupted, the driven member may freewheel relative to the driving member as the rollers become unlocked from their respective cam surfaces.

Another common overrunning coupling includes overrunning coupling sprags disposed between the inner cylindrical surface of an outer race and the outer cylindrical surface of an inner race so that the sprags lock the races together as torque is delivered to the driven member. The sprags become unlocked with respect to the inner and outer race surfaces when torque transfer is interrupted.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of a one-way clutch. The pockets are formed in the planar surface of the pocket plate. Each pocket receives a torque transmitting strut, one end or tail of which engages an anchor point in a pocket of the pocket plate. An opposite edge of the strut, which may hereafter be referred to as an active edge or nose, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Other U.S. patents related to the present invention include: U.S. Pat. Nos. 5,070,978; 5,449,057; 5,806,643; 5,871,071; 5,918,715; 5,964,331; 5,927,455; 5,979,627; 6,065,576; 6,116,394; 6,125,980; 6,129,190; 6,186,299; 6,193,038; 6,244,965; 6,386,349; 6,481,551; 6,505,721; 6,571,926; 6,854,577; 7,258,214; 7,275,628; 7,344,010; and 7,484,605.

Yet still other related U.S. patents include: U.S. Pat. Nos. 4,200,002; 5,954,174; and 7,025,188.

More recent related patent documents include U.S. Pat. Nos. 7,100,756; 7,223,198; 7,383,930; 7,448,481; 7,451,862; 7,455,156; 7,455,157; 7,450,548; 7,614,486; 7,661,518; 7,743,678; 7,942,781; 7,98,372; 7,992,695; 8,042,669; 8,042,670; 8,051,959; 8,056,690; 8,079,453; 8,083,042; 8,091,696; 8,491,439; 8,646,587; 8,720,659; 8,881,516; 8,986,157; 9,121,454; 9,186,977; 9,188,170; 9,188,172; and 9,188,174. Also included are published U.S. patent applications Nos. 2008/0110715; 2011/0269587; 2011/0183806; 2011/0214962; 2011/0297500; 2008/0169165; 2009/0159391; and 2010/0288592.

Normally the desire is to keep the ratcheting reverse struts or radial ratchets of a controllable or selectable one-way clutch covered by a selector plate to keep them from engaging the notch plate of the clutch. If the reverse struts or ratchets are exposed during overrun they can lock to the notch plate. When this happens above a predetermined RPM, such as approximately 200 RPM, the results can be a broken clutch and the vehicle owner is left with a broken transmission.

In other words, a potential failure condition occurs when a slide or selector plate is shifted or moved during the overrun mode or state, exposing the one or more reverse struts or ratchets to engagement with the notch plate at high speed.

Also, with a selectable or controllable one way clutch or brake, a non-synchronous engagement of the struts or ratchets with the notch plate at high speeds could be detrimental. A non-synchronous engagement occurs when the struts are kept from engaging when the clutch/brake is rotating in what would be the lock direction and then the struts are suddenly able to engage. An engagement at a high speed with a high inertia can cause failure instantly.

SUMMARY OF EXAMPLE EMBODIMENTS

An object of at least one embodiment of the present invention is to provide a coupling assembly having an overrun mode and a reverse strut or radial ratchet for use therein, wherein a channel is added to the active edge or tip of the strut or ratchet so that an uncovered or exposed reverse strut or radial ratchet does not engage a notch plate of the assembly until a predetermined "low" RPM is reached. When an adequate amount of fluid flow is between the notch and pocket plates, the fluid interacts in the channel of the strut to keep the strut from entering and engaging a notch of the notch plate at "high" RPM. The use of such a channel in the active edge or tip of the strut or ratchet makes the coupling assembly more robust and failsafe during normal operation.

In carrying out the above object and other objects of at least one embodiment of the present invention, a coupling assembly having an overrun mode is provided. The assembly includes first and second members including first and second coupling faces, respectively, in close-spaced opposition with one another and defining a fluid passage therebetween wherein at least one of the members is mounted for rotation about an axis. The assembly also includes a locking member disposed between the coupling faces of the members and having a ramped, open channel extending through a nose and main body of the locking member to an upper face of the main body. The locking member is movable between first and second positions. The first position is a coupling position characterized by abutting-engagement of the locking member with a respective shoulder of each of the first and second members and the second position is an uncoupling position characterized by non-abutting engagement of the locking member with at least one of the first and second members. Pressurized fluid flowing in the fluid passage is directed to a bottom of the channel to urge the locking member towards the second position upon rotation of the first member in a first direction relative to the second member above a predetermined RPM to prevent abutting engagement of the locking member with a shoulder of the first member in the overrun mode.

The assembly may further include a control element mounted for controlled movement between the coupling faces and operable to control position of the locking member. The control element may have at least one opening which extends completely therethrough to allow the locking member to extend therethrough to the first position in a controlled position of the control element.

The bottom of the channel may have a substantially constant angle or slope with respect to a lower face of the main body of the locking member.

One of the first and second members may be a notch plate and the other of the first and second members may be a pocket plate.

The assembly may be a controllable or selectable one-way clutch assembly.

The predetermined RPM may be about 230 RPM.

The control element may be a control or selector plate rotatable about the axis.

The assembly may include a biasing member carried by the second member to urge the locking member toward the first position.

The angle or slope may be between 10° and 60°.

The pressurized fluid may flow at a rate greater than 50 mL per minute between the coupling faces.

The locking member may move between the first and second positions by pivoting at a tail of the locking member.

Further in carrying out the above object and other objects of at least one embodiment of the present invention, a channeled locking member for a coupling assembly is provided. The locking member includes a member-engaging nose, a member-engaging tail diametrically opposite the nose, and a main body between the nose and the tail and having upper and lower faces. The locking member further includes an open channel extending through the nose and the main body to direct pressurized fluid entering through the nose to a bottom of the channel. The directed, pressurized fluid urges the locking member towards an uncoupling position characterized by non-abutting engagement of the nose with a first member of the assembly upon rotation of the first member relative to a second member of the assembly.

The locking member may further include a pair of oppositely projecting ears which extend laterally from the tail.

The locking member may be a strut.

A tip of the nose and an end of the tail may be canted.

The strut may be a ratchet strut.

The channel may have a rectangular cross-section at the nose portion.

The channel may have a rectangular cross-section along the entire length of the channel in the nose and the main body.

The channel may be centrally located between side faces of the main body.

The bottom of channel may comprise a ramp.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
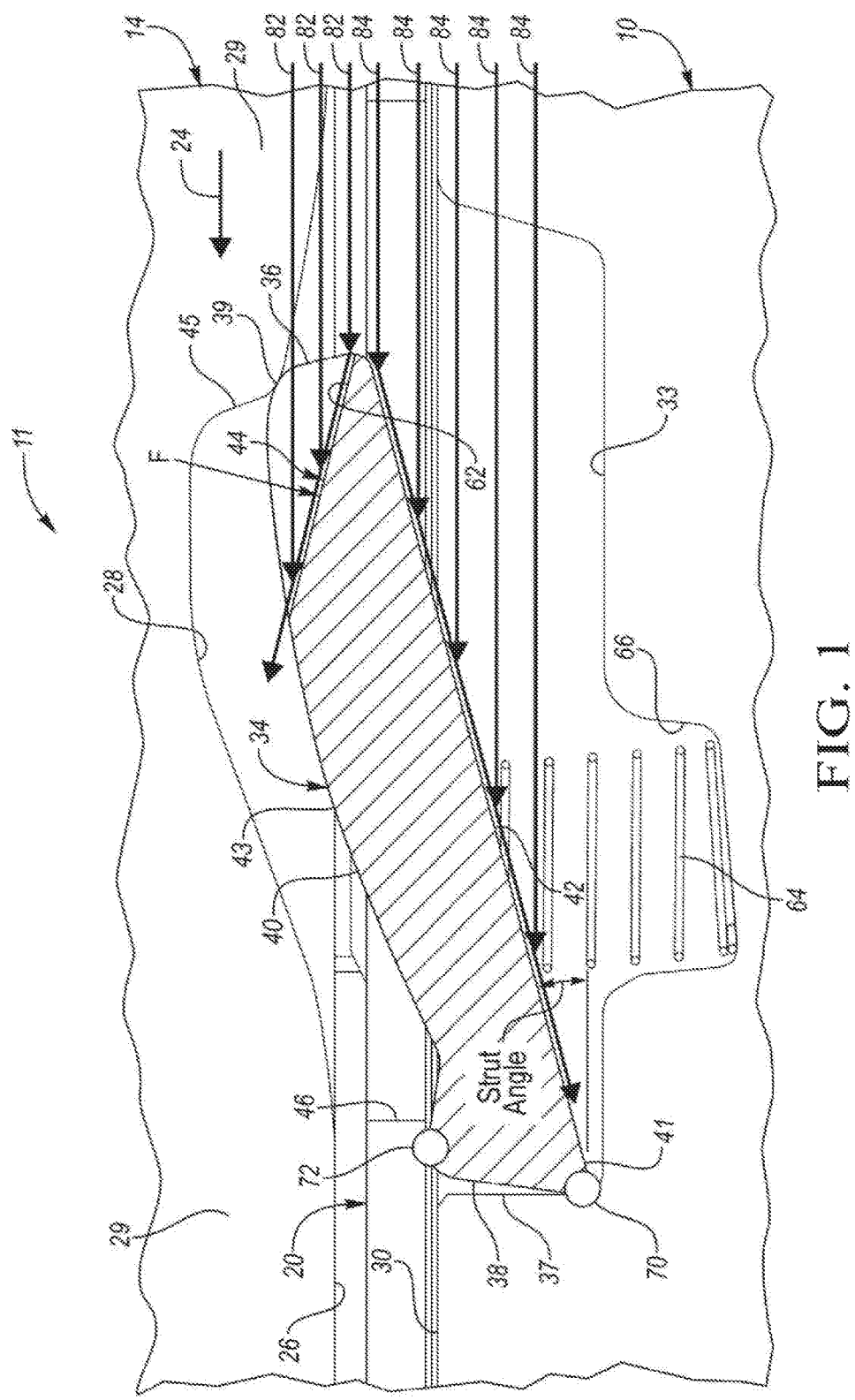
FIG. 1 is a side schematic view, partially broken away, of at least one embodiment of a coupling assembly of the present invention with a locking member or strut of the assembly in a non-abutting position in section.

FIG. 1 shows a pocket member or plate, generally indicated at 10, of a planar or overrunning coupling or clutch assembly, generally indicated at 11, constructed in accordance with at least one embodiment of the present invention. A coupling or notch plate, generally indicated at 14 of the assembly 11, is typically nested within the pocket plate 10. The notch plate 14 may be connected to a part (not shown) via internal splines formed on the notch plate 14, which engage splines on the part. The pocket plate 10 may be typically provided with external splines.

An actuator (not shown) may be drivably connected to a slide or control element or plate, generally indicated at 20, thereby causing the control plate 20 to be adjusted angularly with respect to a central axis about which at least one of the plates 14 and 10 is rotatable. The control plate 20 is disposed between the plates 10 and 14 for limited angular rotation relative to the plates 10 and 14, as generally illustrated in U.S. Pat. No. 7,344,010.

The control element or plate 20 is typically not a full circular part thereby requiring less material to manufacture the part. Hence, the parts 10, 14 and 20 can be nested closer together during a stamping assembly operation. Also, because the control plate 20 is not fully circular, it is easier to install into the clutch assembly.

The plate 14 can free-wheel in one angular direction as indicated by arrow 24 about the central axis relative to the plate 10. The one-directional, free-wheeling motion is achieved in an operating mode when the actuator adjusts the angular position of the control plate 20 relative to the pocket plate 10 (such as via a fork) about the central axis to a forward position which is obtained by moving the control plate 20 angularly a few degrees (such as 10°) from its reverse position.

The notch plate 14 has an inside or reference surface or coupling face 26 with one or more notches 28 formed therein and separated by common walls 29. The notch plate 14 may be adapted to be received in the pocket plate 10 as previously mentioned.

The pocket plate 10 has an inside surface 30 with forward recesses (not shown) and reverse pockets or recesses 33 formed in corresponding pawl-holding portions of the plate 10. Located intermediate the inside surfaces 26 and 30 of the plate 14 and the plate 10, respectively, is the control plate 20.

In one embodiment, there may be nineteen struts or pawls received and retained in the nineteen recesses (twelve forward recesses and seven reverse recesses 33) in the pocket plate 10. Twelve of the pawls are "eared" forward pawls (not shown) for transferring torque in a forward direction about the central axis and seven of the pawls are "eared" reverse pawls, generally indicated 34, clustered or grouped closely together in a curved row or line for preventing rotation between the members 10 and 14 in the "reverse" direction about the central axis. Each of the "eared" forward struts or pawls include a planar substantially rectangular portion and a pair of ears, as generally shown in U.S. Pat. No. 6,065,576.

Figure 2:
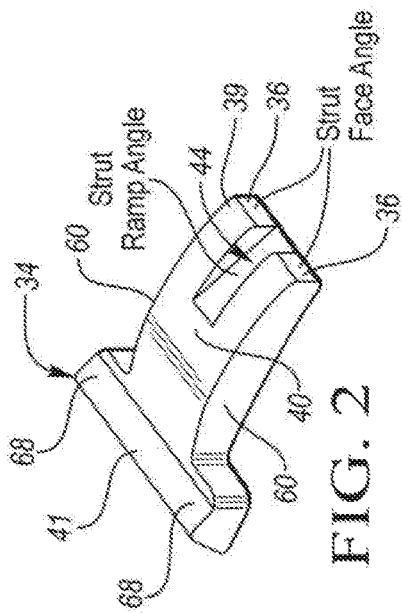
FIG. 2 is a perspective view of a locking member or strut constructed in accordance with at least one embodiment of the present invention.

Referring to FIGS. 1 and 2, each of the reverse pawls or struts 34 includes a first end surface or face 36 at a nose end 39 of the strut 34. The strut 34 further includes a second end surface or face 38 (FIG. 1) at a tail end 41 of the strut 34 circumferentially opposite the first end surface 36. The tail end 41 engages a shoulder 37 in the plate 10. The strut 34 further includes upper and lower faces 40 and 42, respectively, of a main body portion 43 of the strut 34.

The strut 34 also includes an open channel, generally indicated at 44, which extends through the nose 39 and the main body 43 to direct pressurized fluid (as indicated by fluid flow lines 82) entering through the nose 39 to a bottom of the channel 44 and exert a force (F) on the channel bottom. The directed, pressurized fluid urges the locking member or strut 34 towards an uncoupling position characterized by non-abutting engagement of the nose 39 with the first member or plate 14 upon rotation (i.e. in direction 24) of the plate 14 relative to the plate 10 above a predetermined RPM (i.e. typically 230 RPM) to prevent abutting engagement of the strut 34 with a shoulder 45 of the plate 14 in the overrun mode.

Figure 3:
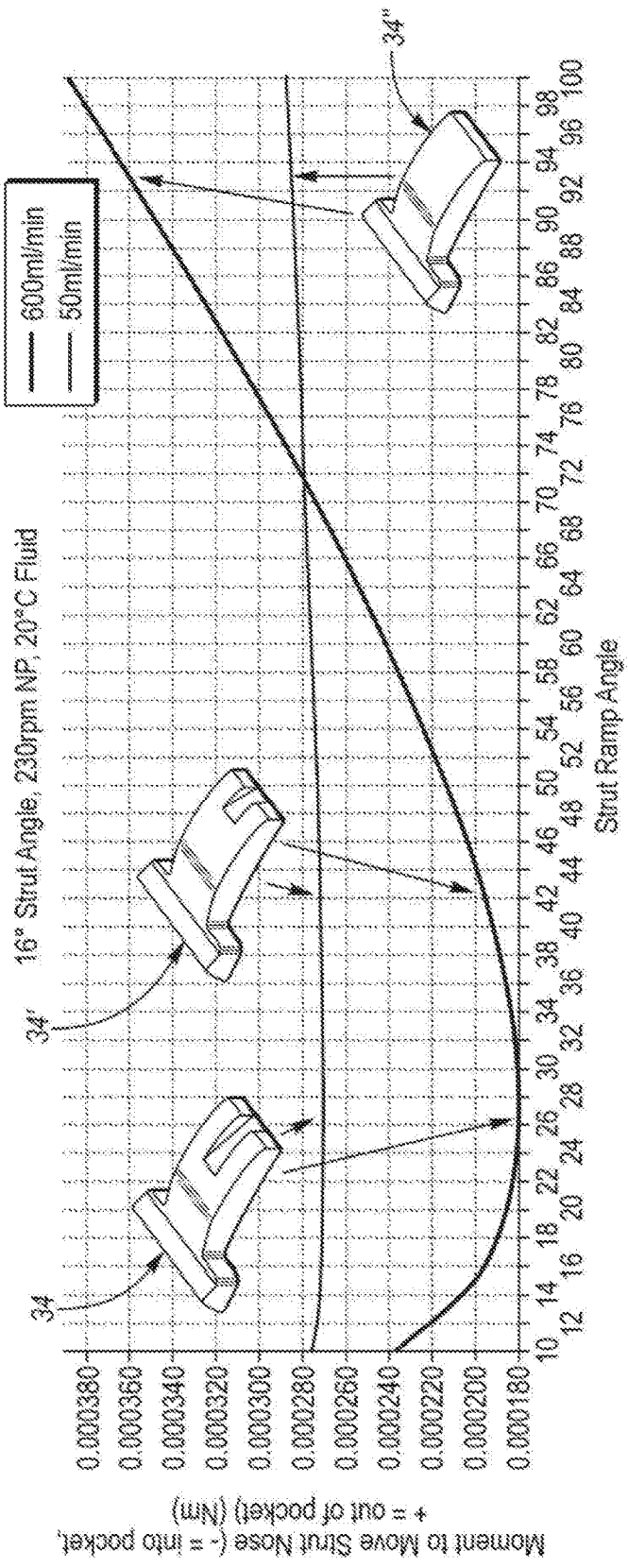
FIG. 3 is a graph of moment needed to move a strut nose versus strut ramp angle for three different struts and for two different fluid (i.e. oil) flow rates and taking into consideration spring and gravity forces on the struts.
Figure 4:
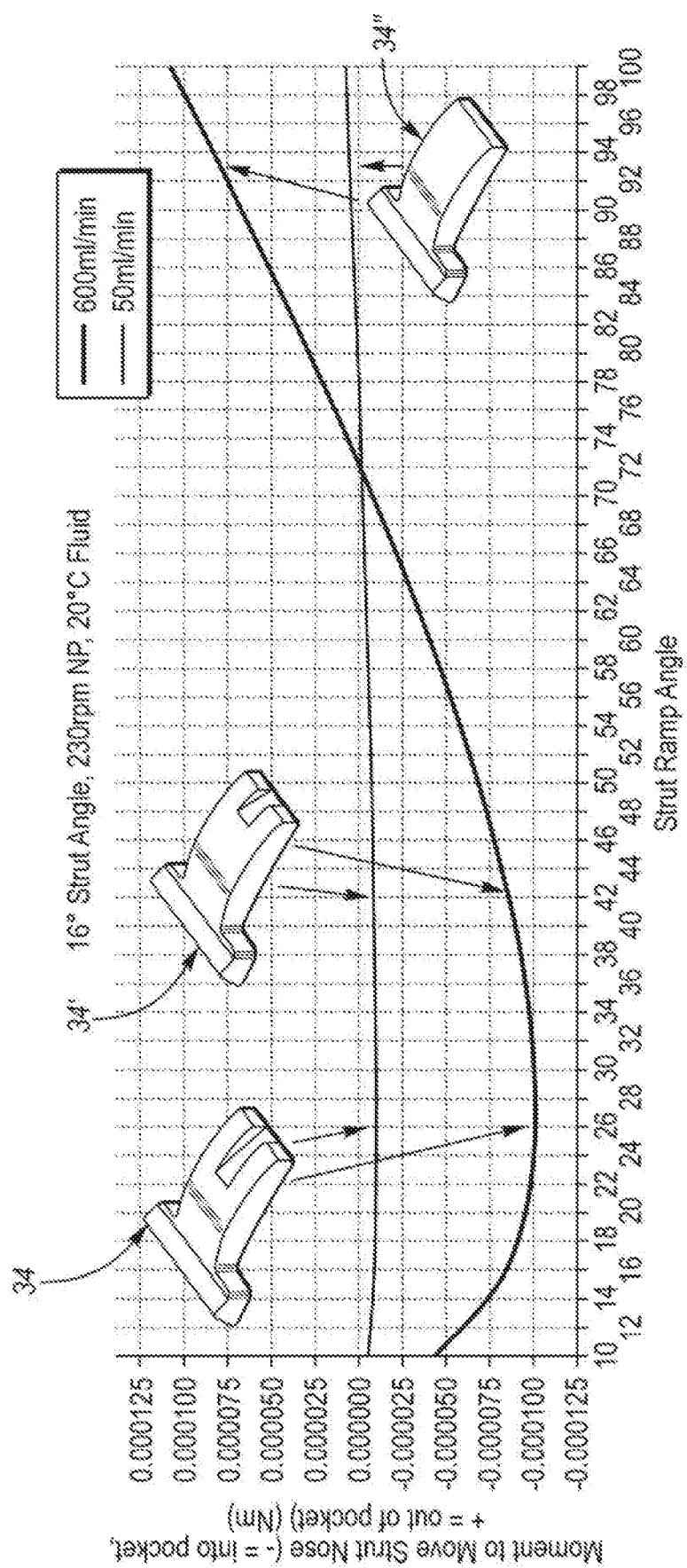
FIG. 4 is a graph similar to the graph of FIG. 3, but with only fluid forces and no spring force on the struts and assuming weightless struts.

Preferably, the channel 44 has a rectangular cross-section along the entire length of the channel 44 in the nose 39 and the main body 43 as shown in FIG. 2. Also, preferably, the channel 44 is centrally located between side faces 60 of the main body 43. The bottom of channel 44 comprises a ramp 62 which has a substantially constant angle or slope with respect to the lower face 42 of the main body 43 of the strut 34. The angle or slope is preferably between 10° and 60° as shown in FIGS. 3 and 4.

Fluid flow lines or components which represent redirected oil flow are indicated at 82 in FIG. 1. Fluid flow lines or components which represent the flow of oil under a conventional strut 34" (FIGS. 3, 4 and 5) are indicated at 84.

When the control plate 20 is situated in its "forward" position it covers the "reverse" set of clustered pawls or struts 34. When the control plate 20 is situated in the "reverse" position it does not cover the "reverse" set of clustered struts 34. When uncovered, the "reverse" struts 34 are allowed to ratchet above a predetermined RPM of the member 14 relative to the member 10. Below the predetermined RPM (such as about 230 RPM) the reverse struts 34 prevent rotation between the pocket plate 10 and notch plate 14 in the "reverse" direction (indicated by arrow 24).

In the example described above, the control plate 20 is provided with seven clustered or grouped apertures 46. These are spaced and arranged angularly about the central axis. When the control plate 20 is appropriately positioned in a "reverse" position, one aperture 46 will be disposed directly over each recess 33.

The apertures 46 and the notches 28 are sized so that the portions of the reverse pawls 34 can enter notches 28 of pawl-receiving portions of the notch plate 14 and engage shoulders 45 of the notches 28 to establish a locking action between the reverse pawls 34 and the plate 14 that will prevent rotation between the plate 14 and the plate 10.

If the control plate 20 is rotated to a different (i.e. forward) angular position from the reverse position, the control plate 20 engages the top surface of the pawls to cause the reverse pawls 34 to rotate downwardly about their pivots 70 into their recesses 33 and will be at least partially covered by the control plate 20 and prevented from moving pivotally upward at an engagement point 72. When the control plate 20 is thus positioned, the plate 14 can free-wheel about the central axis with respect to the plate 10.

The "eared" forward pawls are not covered by the control plate 20 but only by the notch plate 14. The forward pawls typically may rotate outwardly while being partially held by the notch plate 14.

The reverse pawls or struts 34 each have a pair of oppositely projecting ears 68 which extend laterally from their tails 41.

Although any suitable strut spring can be used with one embodiment of the invention, a coil spring 64 is located under each of the forward pawls and reverse pawls 34 within recesses 66 formed in the recesses 33.

When the notch plate 14 is received within or nested within the pocket plate 10 with the control plate 20 therebetween, the plates 10 and 14 are typically held axially fast by a retainer ring or snap-ring (not shown). The snap-ring is received and retained in a groove formed in the plate 10. When assembled, the control plate 20 is typically located within an annular groove (not shown) formed in the pocket plate 10.

The reverse struts 34 may be formed from a length of thin, cold-formed stock material, such as a cold-drawn or cold-rolled wire or spheroidized and annealed SAE 1065 steel. Each strut 34 may be tumbled to achieve a suitable edge corner break, such as a maximum of 0.015 inches; hardened at 1550° F.; oil quenched; and tempered at 350° F. to a minimum hardness of 53 Rockwell-C. Alternatively, the reverse struts may be formed via metal injection molding.

FIG. 3 is a graph which shows how the moment needed to move a strut nose varies for three differently configured struts 34, 34' and 34" for two different fluid flows at a rotation of 230 RPM of the notch plate (NP) at different strut ramp angles for the struts 34 and 34'. External forces on the struts 34, 34' and 34" include the spring force and force from fluid hitting the struts.

The optimum strut ramp angle is one that creates enough down force (y-force) without creating too much x-force, since x-force will want to rotate the strut out of its pocket. The flatter the ramp in the strut (the smaller the ramp angle) the closer the down force is to the strut pivot point which lowers its moment.

FIG. 4 is a graph similar to FIG. 3 but with the removal of the spring force and assuming a weightless strut.

Figure 5:
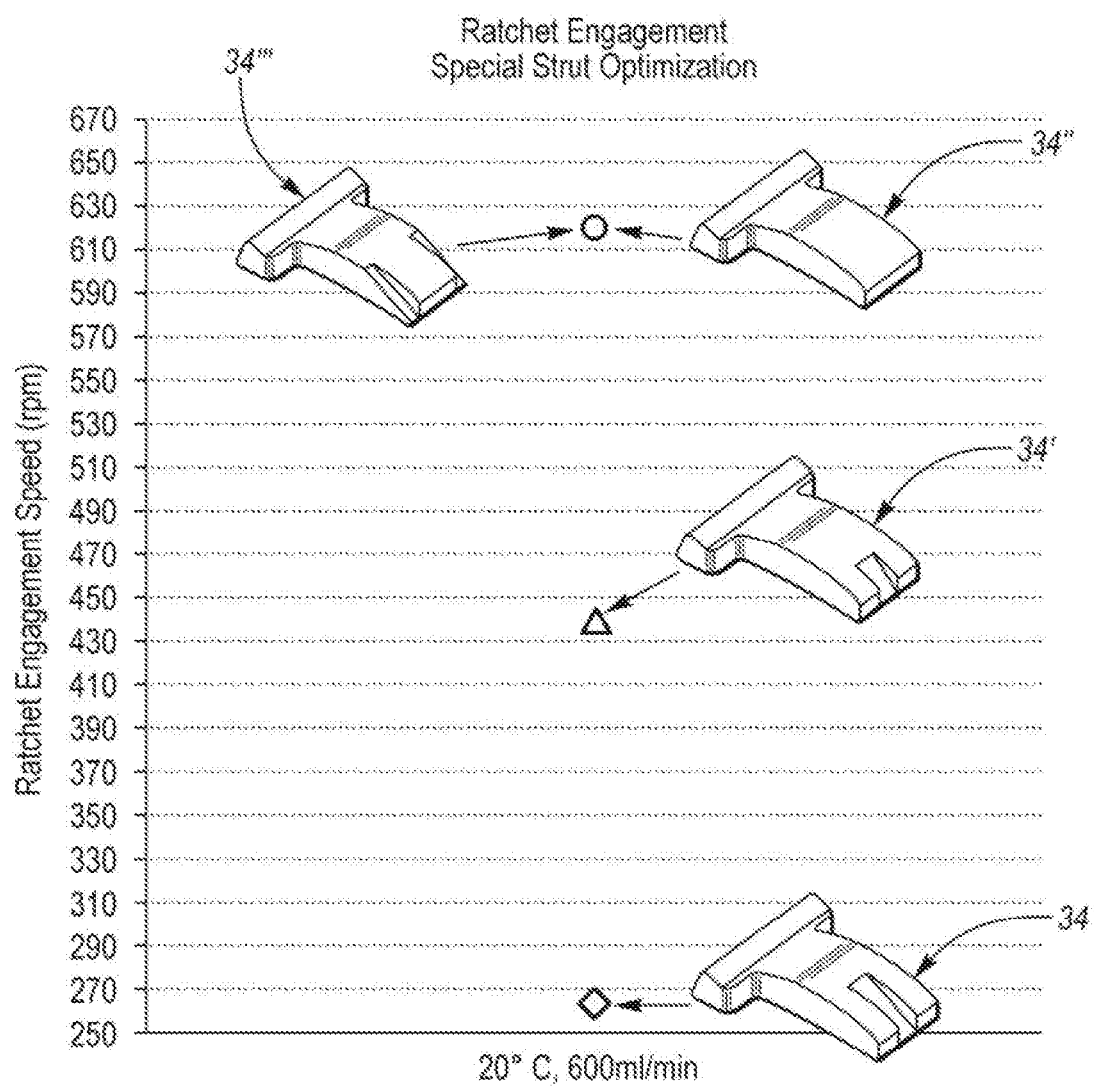
FIG. 5 is a graph of ratchet engagement speed (i.e. RPM) for a particular fluid flow rate and a number of different struts including struts constructed in accordance with different embodiments of the present invention.

FIG. 5 illustrates that while struts 34''' and 34 have the same angle and ramp surface area, the struts 34''' and 34 test completely different. This is because the inside ramp of strut 34 (as well as the inside ramp of strut 34') traps the fluid between the strut 34 and an incoming notch of the notch plate 14 thereby lowering strut engagement speed. The outside ramps of the strut 34''' allow fluid to be pushed out of the way thereby raising ratchet engagement speed.

It is to be understood that instead of the coupling assembly disclosed above, a second embodiment coupling assembly having radial ratchets may also be provided wherein the shape of the radial ratchets and notch tips are preferably ellipsoids.

While exemplary embodiments are described above, it is not intended that these embodiments describe all possible forms of the invention. Rather, the words used in the specification ae words of description rather than limitation, and it is understood that various changes may be made without departing from the spirit and scope of the invention. Additionally, the features of various implementing embodiments may be combined to form further embodiments of the invention.

What is claimed is:

1. A channeled locking member for a coupling assembly, the locking member comprising:
    a member-engaging nose;
    a member-engaging tail diametrically opposite the nose;
    a main body between the nose and the tail and having upper and lower faces; and
    an open channel extending through the nose and the main body to direct pressurized fluid entering through the nose to a bottom of the channel, the directed, pressurized fluid urging the locking member towards an uncoupling position characterized by non-abutting engagement of the nose with a first member of the assembly upon rotation of the first member relative to a second member of the assembly.

2. The locking member as claimed in claim 1, further comprising a pair of oppositely projecting ears which extend laterally from the tail.

3. The locking member as claimed in claim 1, wherein the locking member is a strut.

4. The locking member as claimed in claim 3, wherein the strut is a ratchet strut.

5. The locking member as claimed in claim 1, wherein a tip of the nose and an end of the tail are canted.

6. The locking member as claimed in claim 1, wherein the channel has a rectangular cross-section at the nose portion.

7. The locking member as claimed in claim 6, wherein the channel has a rectangular cross-section along the entire length of the channel in the nose and the main body.

8. The locking member as claimed in claim 1, wherein the channel is centrally located between side faces of the main body.

9. The locking member as claimed in claim 1, wherein the bottom of channel comprises a ramp.

\* \* \* \* \*